United States Patent

Menz

[11] Patent Number: 5,924,871
[45] Date of Patent: Jul. 20, 1999

[54] GROUNDING CONTACT

[75] Inventor: Bertram Menz, Wetzlar, Germany

[73] Assignee: Schunk Metall und Kunststoff GmbH, Wettenberg, Germany

[21] Appl. No.: 08/850,768

[22] Filed: May 2, 1997

[30] Foreign Application Priority Data

May 3, 1996 [DE] Germany ............................ 196 17 710

[51] Int. Cl.$^6$ ................................................ H01R 39/00
[52] U.S. Cl. ............................................. 439/16; 439/197
[58] Field of Search ............................. 439/92, 34, 197, 439/16

[56] References Cited

U.S. PATENT DOCUMENTS 3,609,628  9/1971  Cabaussel ................................. 439/16

FOREIGN PATENT DOCUMENTS 0582888  2/1964  European Pat. Off. .
 81136   4/1971  Germany .
176524   8/1935  Switzerland .

Primary Examiner—Steven L. Stephan
Assistant Examiner—Javaid Nasri
Attorney, Agent, or Firm—Dennison, Meserole, Pollack & Scheiner

[57] ABSTRACT

The invention relates to a lightweight grounding contact for the transfer of currents between fixed vehicle elements of a rail vehicle and its rotating wheel axle, consisting of a plurality of contact elements (12), acted upon by a pressure in the direction toward the wheel axle, which element rests on a contact surface which originates at the wheel axle and is made of a carbon material. To achieve an always flat resting of the contact element on the contact surface, at least one contact element (12) is acted upon by pressure with a device (22) filled with a fluid (20).

19 Claims, 2 Drawing Sheets

GROUNDING CONTACT

BACKGROUND OF THE INVENTION

The invention relates to a grounding contact for the transfer of currents between fixed vehicle elements of a rail vehicle, in particular an electric, diesel-electric or diesel-hydraulic locomotive or of a self-propelled or long-distance vehicle, and its rotating wheel axle, consisting of at least one contact element, acted upon by a pressure in the direction toward the wheel axle. The contact element rests on a contact surface which originates indirectly or directly at the wheel axle and in particular is made of a carbon material or contains the same.

It is possible to return work and/or signal currents of rail vehicles to the rail, and thus to the energy source, via wheel axles and axle wheels. The transfer from the fixed vehicle elements to the rotating axles is performed by means of special current bridges, which are usually called reverse current/grounding contacts.

The rolling bearings of the axles can be located in the useful current circuit or the parasitic current circuit. To protect them against current flow and therefore against destruction, the reverse flow/grounding contact must form a low- impedance bridge. Current flow through the bearing starts at a voltage present at the bearing of, for example, 0.5 to 1 V (fritt voltage). Together with a rapidly increasing amount of current, the value of the transition voltage subsequently drops to approximately 0.5 V.

Reverse current/signal current/grounding contacts should make a good and secure electrical connection between the reverse current connection on the vehicle and the wheel axle over a defined current pith in all operating situations of the vehicle. Furthermore, it must be assured, in particular in the course of a signal transmission, that a constant transition resistance is present.

In connection with a grounding contact known from DE-OS 1 953 043, a carbon brush is seated, spring-loaded and not rotatable, in a housing originating at an axle of an electrical rail vehicle, which is supported in respect to a rotating contact disk. In this case the carbon brush can either be pressed against a contact plate by means of a pressure spring, or the plate can be pushed against the carbon brush by means of a tension spring. When using a pressure spring, it can possibly originate at a disk which is directly connected with the axle.

A cleaning block is known from DD 81 136, which is not intended as a grounding contact and which can be pressed against the running surface of the wheel of a rail vehicle by means of a hydraulic or pneumatic cylinder.

An electrical rail vehicle with a rubber-sprung driving wheel is known from CH 176 524. In this case the work current is derived via a carbon brush which is pressed against a wheel tire in such a way that the carbon brush simultaneously acts as cleaning block for the running surface of the wheel tire.

A grounding contact of the type mentioned at the outset can be taken from EP 0 582 888 A1. There the contact surface on which the carbon brush is supported consists of carbon material or contains the same. By means of this the advantage of a reduction of wear results in contrast to other grounding contacts.

The instant invention is based on the object of further developing a grounding contact of the type described at the outset in such a way, that low maintenance is achieved along with small structural size and low weight, wherein it should be simultaneously assured that the contact element, such as a carbon brush or carbon brushes, rests or rest flat against the contact surface to the required extent.

The object is attained in accordance with the invention in that the at least one contact element is acted upon by the pressure of a disk-shaped device filled with a fluid or a flowable material, on the contact element side the device is delimited by a flexible element, which rests flat against the contact element, a pressure plate element, which can be charged by means of a spring tension in the direction toward the contact element acts on the side of the device remote from the contact element.

By means of these steps inaccuracies can be compensated without problems, wherein it is simultaneously assured that the contact element, such as a carbon brush or carbon brushes, rests flat against the contact surface to the required extent. Because the device transferring the pressure can be filled with a fluid or a flowable material, i.e. fulfills the function of a cushion, a small structural size is possible. Regardless of the number of contact elements, such as carbon brushes, supported on the contact surface, only a single pressure-exerting device, such as a cushion, is necessary, so that a structural simplification results, along with the simultaneous increase of the required maintenance intervals.

The invention provides in particular that the side remote from the contact element has a further flexible element on which the pressure plate element acts.

To assure a structurally simple construction, it is provided that the device has a circumferential frame, U-shaped in cross section, on the inside of which a support ring is disposed, between which and the frame the flexible elements are fixed in place, such as clamped.

Fluids with high compressibility are particularly considered, such as liquids. In this case glycol is particularly to be preferred. Other suitable, environmentally friendly flowable materials as also suitable. Brake fluid, grainy material, such as sand, can be cited as examples.

In order to fill the device in simple steps, a further suggestion of the invention provides that the frame has a filler opening, which can be closed by means of a ball on the inside and by means of a closing element, such as a screw, on the outside.

In general, it should be possible to fill the interior of the device, which is delimited at least on the side of the contact element by the flexible element, via a flap valve cut into the frame.

To realize a simple structure of the frame itself it is provided that it is composed of clamping rings, which are L-shaped in cross section. The frame itself can be received in a hollow- cylindrical holder, from which a yoke originates at the side remote from the contact element, which is a support for the spring element, such as a helical spring, acting on the pressure plate element.

The contact element itself can consist of segments separated by spacer elements which, viewed from the direction of the contact surface, have a triangular shape. Even though this is considered to be a preferred embodiment of the contact element, other arrangements can also be employed for being installed in a grounding contact in accordance with the invention.

DETAILED DESCRIPTION OF THE INVENTION

Figure 1:
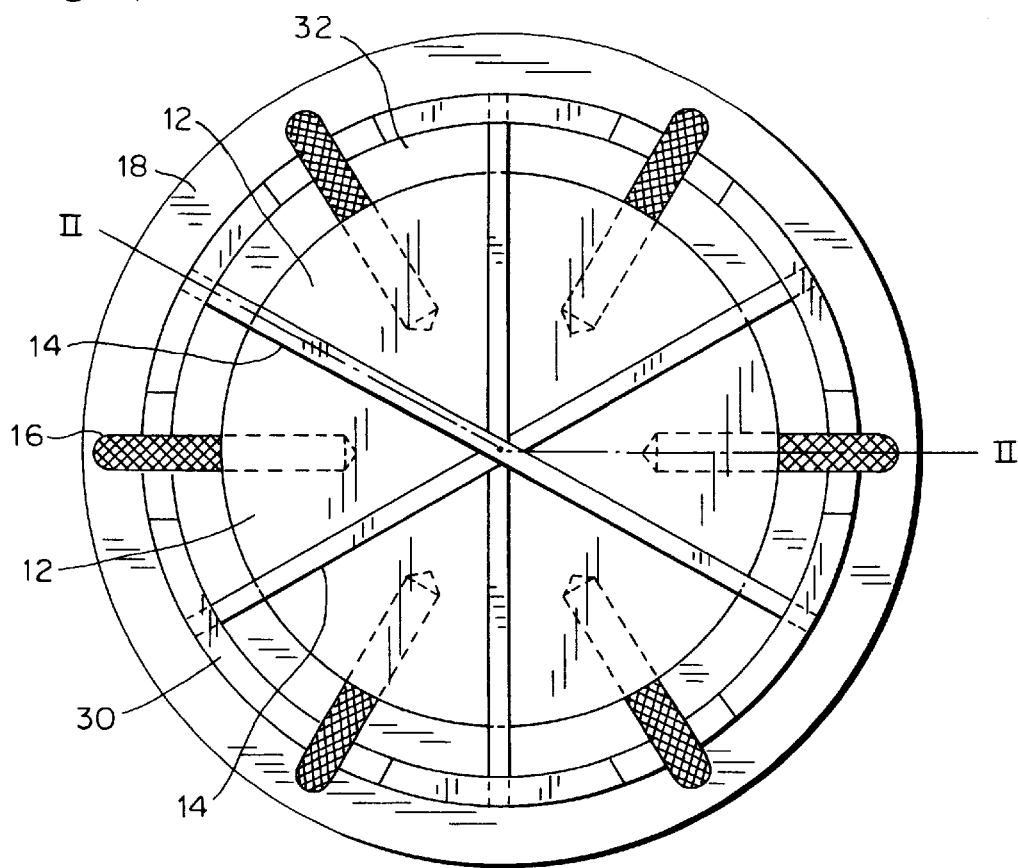
FIG. 1, is a view from below of a grounding contact.

The invention will be explained in detail in view of the drawing figures showing a preferred embodiment.

Essential elements of a reverse current/signal current/grounding contact are represented in the drawing figures, by means of these elements it is intended to transmit currents between fixed vehicle elements of a rail vehicle and its rotating axle. To this end a contact disk 10, preferably consisting of a carbon material or containing the same, indirectly or directly originates at a rotating axle 54, against which a contact element 12 is pressed. The contact element is seated in a holder originating at a fixed vehicle element. In the exemplary embodiment the contact element consists of a total of six carbon brushes which, viewed from the direction of the contact disk 10, have a triangular shape and are separated from each other by means of fixating or separating bars 14. However, it is possible to make reference to known constructions in this respect. Also, for reasons of simplicity, carbon brushes will be mentioned hereinafter in place of contact element.

Figure 2:
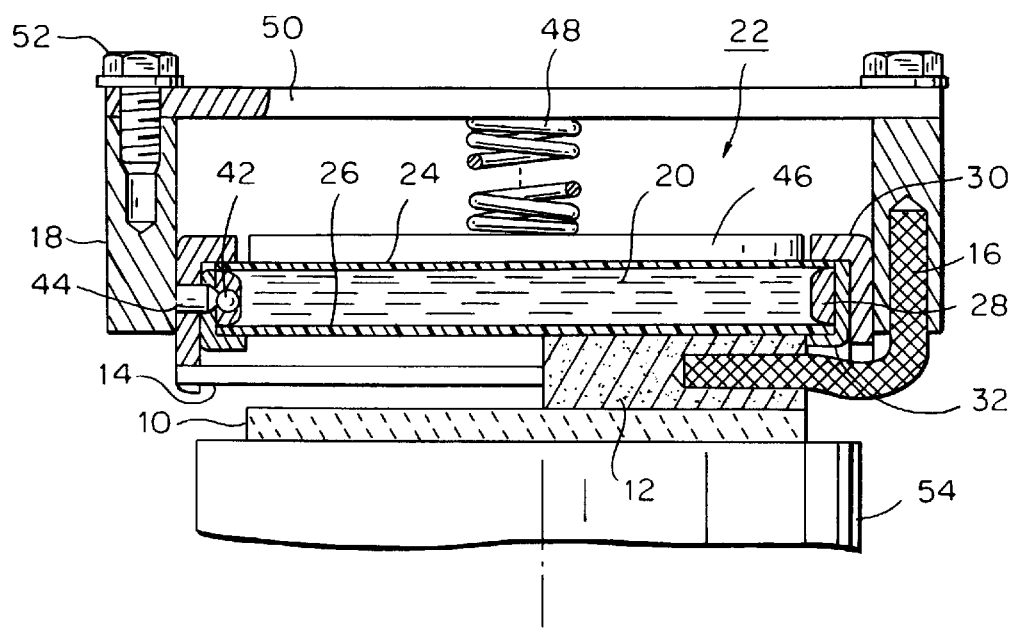
FIG. 2, is a section along the line II in FIG. 1.
Figure 3:
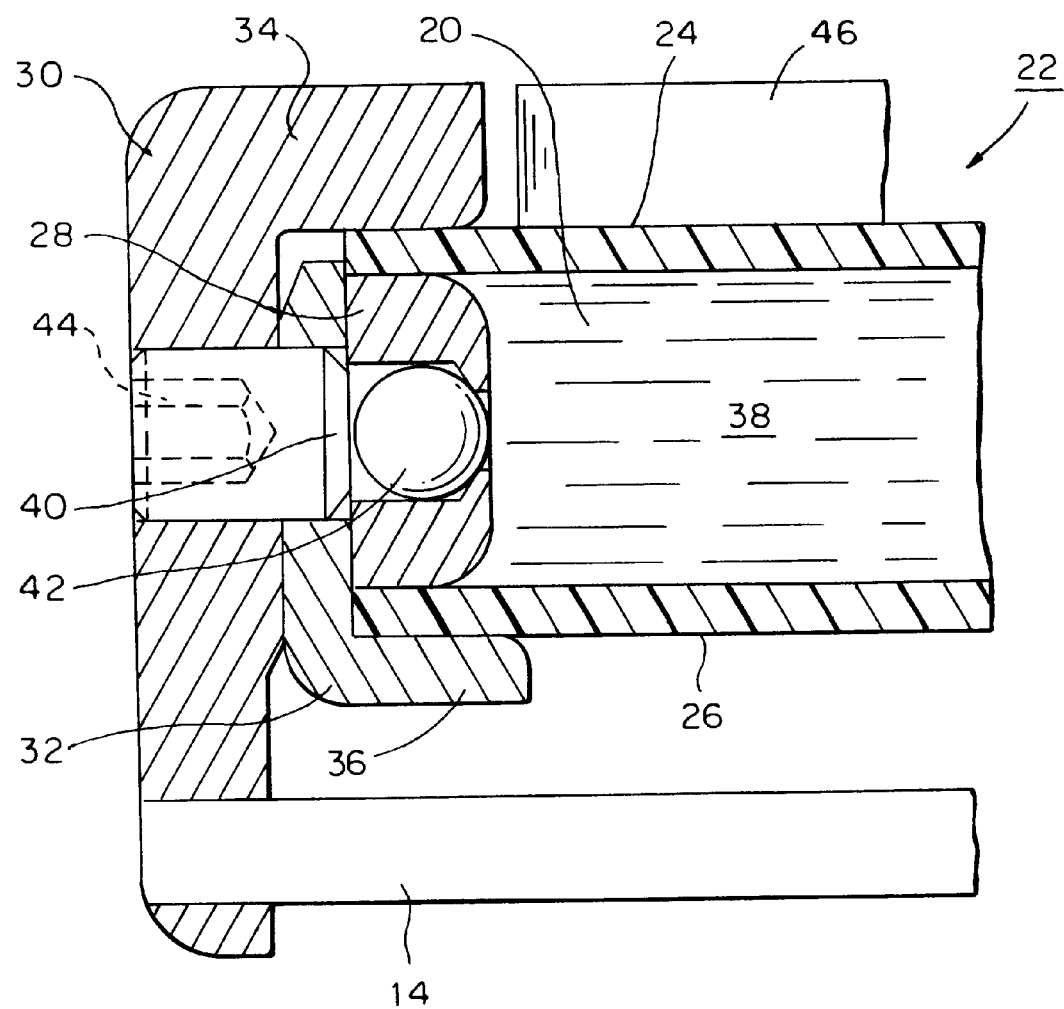
FIG. 3, is a detailed representation of the grounding contact in accordance with FIGS. 1 and 2.

As can be seen from the sectional view in FIG. 2, a current transmission rope, such as a stranded brush conductor 16, originates at each carbon brush and is fixed electrically conducting in a hollow cylinder, which is designated as a contact ring 18 and which simultaneously can take up the function of a bearing bush. The contact ring 18 then can be fastened in a housing which will be connected with the fixed vehicle element. Other fastenings or constructions are also conceivable.

In order to assure that the carbon brushes 12 rest flat to the required extent and on the contact disk 10, they must be acted upon by pressure. To this end a disk-shaped device 22 is provided in accordance with the invention. This device is filled with a pressure medium, such as a liquid 20, and performs the function of a cushion, which has the following construction.

The device 22 has upper and lower flexible elements which hereinafter will be respectively identified as 24, 26 for reasons of simplification. On the side of the circumference, the diaphragms 24, 26 are, on the one hand, spaced apart by means of a support ring 28, and on the other hand sealed against the exterior. The volume delimited by the diaphragms 24 and 26 and the support ring 28 can then be filled with the fluid 20.

The diaphragms 24, 26 with the support ring 28 are received and are fixed in place in a frame formed by an exterior clamping ring 30 and an interior clamping ring 32, which itself is received in the contact ring 18.

The interior and exterior clamping rings 30, 32 have an L-shape in cross section, the diaphragms 24, 26 and the support ring 28 are clamped between the legs 34, 36 of the exterior and interior clamping rings 30, 32. Legs 34, 36 extend along the diaphragms 24, 26.

To fill the interior chamber 38 which is delimited by the diaphragms 24, 26 and the support ring 28, a bore 40 extends through the frame formed by the clamping rings 30, 32 and including the support ring 28, which can be closed in the interior by a ball 42 and on the exterior by a screw, such as a stud screw 44. A non-return valve is formed by this.

A pressure plate 46 is supported on the diaphragm 24 which is located remote from the carbon brushes. The device 22, i.e. the diaphragms 24, 26 as well as the fluid 20 enclosed by them, are put under pressure in order to press the carbon brushes 12 against the contact disk 10 to the required extent and to make a flat contact.

So that the required pressure can act via the pressure plate 46 on the diaphragms 24, 26 and the fluid 20, a spring element in the form of a helical spring 48, is supported on a yoke 50. The yoke originates at the contact ring 18 and is connected with it by means of screws 52 so that the spring 48, acts between the yoke and an exterior side of the pressure plate 46.

On the side of the carbon brushes the diaphragm 26 is charged with the required pressure, which is transferred to the carbon brushes 12, via the pressure plate 46 and the fluid 20. A fluid of high compressibility, i.e. a liquid such as glycol, is particularly suited as the fluid. The fluid is to be filled into the volume of the interior chamber 38 without any entrained air.

A quite compact structure results because of the device 22 which is constructed in layers, so that the grounding contact has a low structural height. Weight advantages result at the same time. Low maintenance requirements also result because of the simple construction.

It is of course not required to delimit the device on both sides by a diaphragm. Instead, one diaphragm, which rests against the carbon brush, is sufficient.

I claim:

1. A grounding contact for transfer of currents between fixed vehicle elements of a rail vehicle and its rotating wheel axle, consisting of at least one contact element (12), acted upon by pressure in a direction toward the wheel axle, where the contact element rests on a contact surface which originates at the wheel axle and which is made of a carbon material said grounding contact comprising:

a disc-shaped device (22) filled with fluid (20);

the at least one contact element (12) is acted upon by the pressure of the disk-shaped device (22);

a first flexible element (26) on a contact element side of the disc-shaped device which rests flat against the contact element (12);

spring means (48); and a pressure plate (46), which is charged by the spring means in a direction toward the contact element, said spring means acting on the side of the disc-shaped device which is remote from the contact element.

2. The grounding contact in accordance with claim 1, wherein the side remote from the contact element of the disc-shaped device including a second flexible element (24), on which the pressure plate element (46) acts.

3. The grounding contact in accordance with claim 1, wherein all contact elements (12) resting on the contact surface (10), or their segments, are acted upon by pressure from the single device (22) filled with the fluid (20).

4. The grounding contact in accordance with claim 1, wherein the fluid (20) has a high compressibility.

5. The grounding contact in accordance with claim 1, wherein the contact element (12) consists of segments separated by means of spacer elements (14).

6. The grounding contact in accordance with claim 1, wherein the contact element (12) or its segments are carbon brushes.

7. The grounding contact in accordance with claim 4, wherein the fluid (20) is selected from one of glycol, oil, or contains the same.

8. The grounding contact in accordance with claim 2, wherein the disc-shaped device includes a circumferential frame (30, 32), which is U-shaped in cross section, on the inside of which a support ring (28) is disposed, between the support ring and the frame (30, 32) the first and the second flexible elements are fixed in place.

9. The grounding contact in accordance with claim 8, wherein the fluid (20) has been filled, free of entrained air, into a chamber (38) which is delimited by the first and the second flexible elements (24, 26) and the support ring (28).

10. The grounding contact in accordance with claim 8, wherein the frame (30, 32) has a filler opening (40), which closed in the interior by means of a ball (42) and on the exterior by means of a closure element (44).

11. The grounding contact in accordance with claim 8, wherein the frame (30, 32) consists of an exterior clamping ring (30), L-shaped in cross section, and of an interior clamping ring (32), L-shaped in cross section.

12. The grounding contact in accordance with claim 8, wherein the flexible elements (24, 26) extend along its opening, the frame (30, 32) has a cup shape, and is fixed in place by means of a clamping ring (32).

13. The grounding contact in accordance with claim 2, wherein the first and the second flexible elements are diaphragms.

14. The grounding contact in accordance with claim 5, wherein the contact surface (10), segments, such as the segments of the contact element (12), have a triangular shape.

15. The grounding contact in accordance with claim 9, wherein the chamber (38) has been filled via a non-return valve.

16. The grounding contact in accordance with claim 12, wherein the first and second flexible elements are disposed in a sealed manner peripherally between the support ring (28) and legs (34, 36), extending along the flexible elements, of the exterior or interior clamping ring (30, 32).

17. The grounding contact in accordance with claim 10, wherein the closure element is a screw.

18. A grounding device for transfer of current between a fixed vehicle element of a rail vehicle and a contact disc on the vehicle rotating wheel axle, said device comprising:

a contact ring in the form of a cylinder having a first end closed by a yoke;

a disc-shaped device including a pressure plate operable in the contact ring;

spring means inserted between the yoke and the pressure plate;

said disc-shaped device including a cushion formed between a first and second flexible element, a support ring cooperating with the flexible elements, means for providing a sealed chamber and a fluid filling the sealed chamber;

at least one carbon brush electrically connected to the contact rings, and said spring means operating to press the disc-shaped device against the carbon brush which in turn is pressed against the contact disc on the rotating wheel axle.

19. The grounding device according to claim 17, wherein said means for providing the sealed chamber includes a support ring for the cushion;

an interior clamping ring, an exterior clamping ring, each ring having an L-shaped cross-section, the first and the second flexible element being clamped between extended portions of the L-shaped interior and exterior clamping ring.

* * * * *